April 16, 1963 N. H. KENT ETAL 3,085,396
GAS TURBINE ENGINE WITH GAS STARTER
Filed June 30, 1960 2 Sheets-Sheet 1

Nelson Hector Kent & Stanley Frank Smith Inventor

By Fred E. Shoemaker
Fred L. Witherspoon, Jr. Attorney

April 16, 1963  N. H. KENT ETAL  3,085,396
GAS TURBINE ENGINE WITH GAS STARTER
Filed June 30, 1960  2 Sheets-Sheet 2
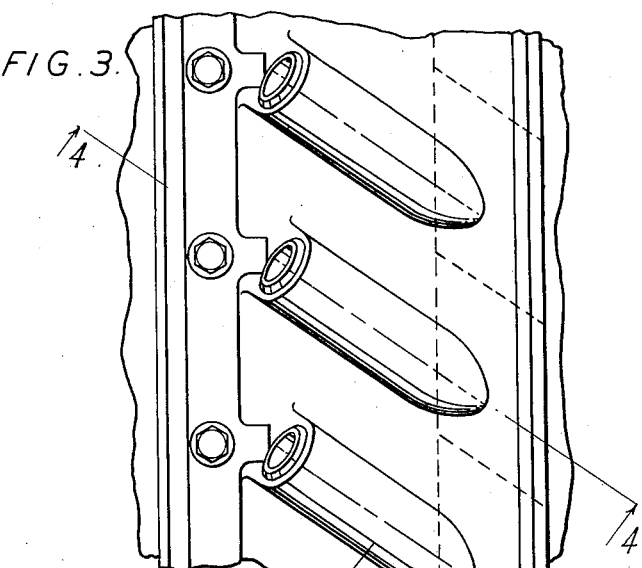
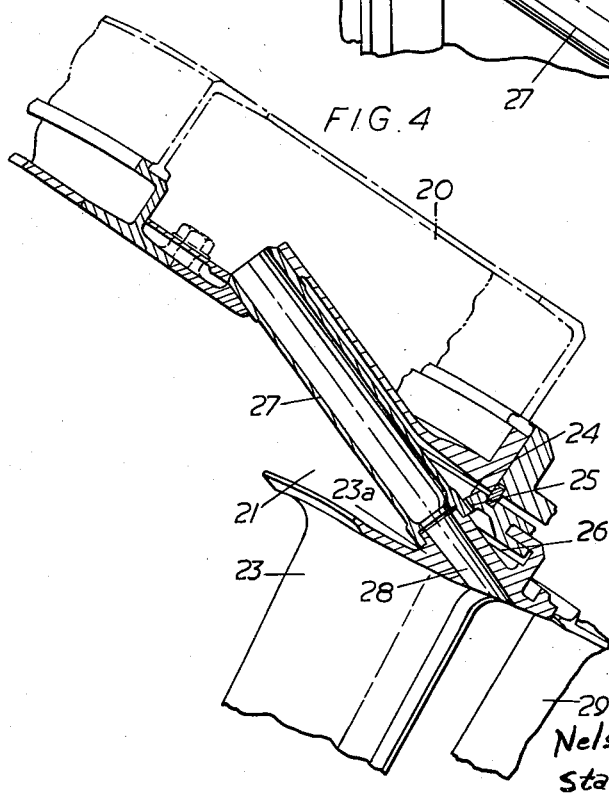
Nelson H. Kent Inventors
Stanley F. Smith
By Fred E. Shoemaker
Fred L. Witherspoon, Jr. Attorney

United States Patent Office 3,085,396
Patented Apr. 16, 1963

3,085,396
GAS TURBINE ENGINE WITH GAS STARTER
Nelson Hector Kent, Derby, and Stanley Frank Smith, Mickleover, Derby, England, assignors to Rolls-Royce Limited, Derby, England, a British company
Filed June 30, 1960, Ser. No. 39,852
Claims priority, application Great Britain July 3, 1959
6 Claims. (Cl. 60—39.14)

This invention concerns a gas turbine engine provided with means for effecting starting of a turbine of the engine.

According to the present invention there is provided a gas turbine engine comprising an annular cooling air passage arranged around stator vanes of a turbine of the engine, a manifold adapted to be supplied with gas under pressure, and a plurality of conduits for directing pressurised gas from said manifold and onto the rotor blades of the said turbine so as to effect starting of the turbine, the conduits being so arranged as to permit flow of cooling air through said passage.

Preferably the manifold is an annular manifold arranged about the cooling air passage, the said conduits being spaced conduits extending across the cooling air passage.

The said conduits preferably comprise nozzles whose axes are obliquely arranged with respect to the longitudinal axis of the engine, said nozzles being adapted to direct the pressurised gas onto the rotor blades.

The outer ends of the stator vanes may be provided with platforms, the said nozzles being formed integrally with said platforms, each platform and its associated nozzle being cast in a single casting operation.

The engine may comprise a high pressure turbine and a low pressure turbine, the cooling air passage being arranged around the stator vanes of the low pressure turbine and the said conduits being arranged to direct pressurised gas onto the rotor blades of the low pressure turbine.

Preferably the said stator vanes are inlet guide vanes.

The invention is illustrated, merely by way of example, in the accompanying drawings, in which:

FIGURE 3 is a view illustrating the formation and disposition of the said tubes, and FIGURE 4 is a section taken on the line 4—4 of FIGURE 3.

Figure 1:
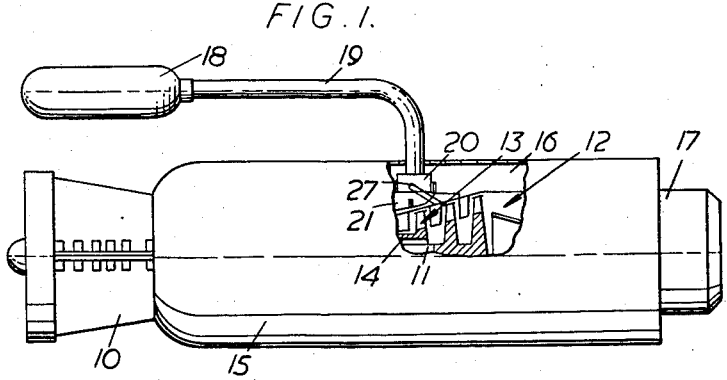
FIGURE 1 is a diagrammatic elevation, partly in section, of a gas turbine engine according to the present invention.
Figure 2:
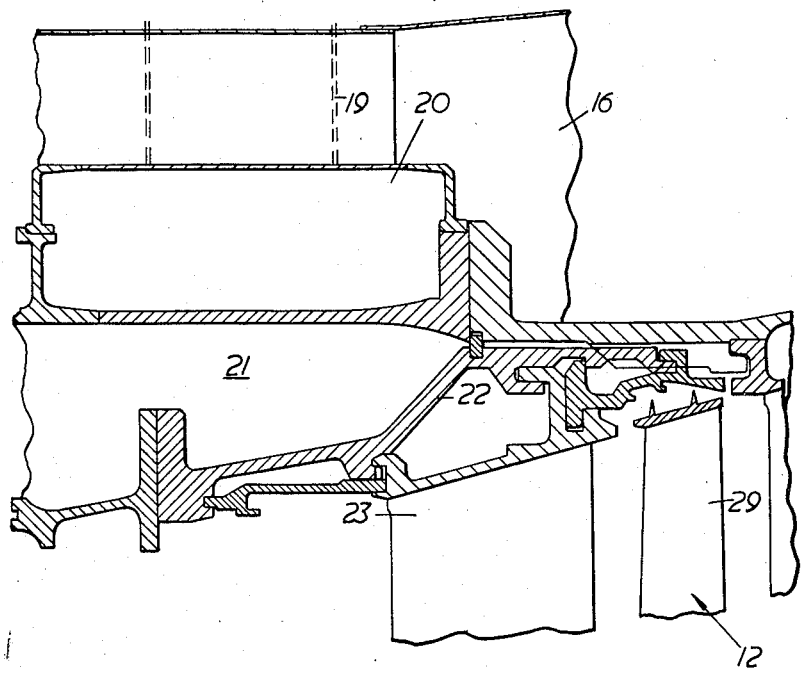
FIGURE 2 is a section of part of the engine shown in FIGURE 1, said section, which is taken parallel to the longitudinal axis of the engine, being taken between the positions of certain tubes which extend across an annular cooling air passage shown in this figure.

Referring to the drawings, a gas turbine, jet propulsion engine of the by-pass type comprises a low pressure compressor 10 which is mounted on a shaft 11 driven by a low pressure turbine 12. A high pressure turbine 13, which is mounted on a shaft 14 arranged concentrically about the shaft 11, drives a high pressure compressor (not shown, but disposed within an engine casing 15 which also contains the usual combustion equipment).

Some of the air which has been compressed by the low pressure compressor 10 is fed (by means not shown) into a by-pass passage 16 which extends about a jet pipe 17 into which the turbine exhaust gases are directed.

In order to effect starting of the engine, the engine is provided with a bottle 18 which may contain air (or other gas) under pressure or, which, alternatively, may contain a material which may be exploded or otherwise treated to produce a supply of gases under pressure. A pipe 19, which may incorporate a shut-off valve operable by the pilot of an aircraft provided with the engine, supplies pressurised gas from the bottle 18 to an annular manifold 20 disposed within the by-pass passage 16.

The annular manifold 20 is arranged about and has a common wall with an annular cooling air passage 21 which is supplied (by means not shown) with cooling air from the compressors of the engine. The downstream end of the cooling air passage 21, which has spaced struts 22 extending across it, is arranged about the low pressure turbine 12. Cooling air is thus supplied by the passage 21 to the outer ends of the inlet guide vanes 23 of the turbine 12. A wall 24 (see FIGURE 4) extends across the passage 21 and has apertures 25 therethrough which communicate with an annular chamber 26 extending about the inlet guide vanes 23. Cooling air is thus supplied also to the chamber 26 so as to effect maximum cooling of the vanes 23.

A plurality of angularly spaced apart tubes 27 extend across the cooling air passage 21, the upstream ends of the tubes 27 communicating with the annular manifold 20. Each of the tubes 27 communicates at its downstream end with a nozzle 28 cast integrally with the outer platform 23a of the guide vanes 23.

The nozzles 28 are adapted to direct pressurised gas from the bottle 18 onto the first stage rotor blades 29 of the low pressure turbine 12, whereby to rotate the turbine 12. In order to ensure that pressurised gas passing through the nozzles 28 is directed at the most effective angle onto the blades 29, the tubes 27 and nozzles 28 are arranged obliquely to the longitudinal axis of the engine.

In the gas turbine engine construction shown in the drawings, the nozzles 28 may readily be shaped both to give good economy in the use of pressurised gas from the bottle 18 and to ensure that the said pressurised gas is at an appropriate velocity for impinging on the blades 29.

The tubes 27, moreover, are well spaced from each other with the result that there is little obstruction to the flow of cooling air through the passage 21. Good all round cooling of the vanes 23 may therefore be effected.

We claim:
1. A gas turbine engine including compressor means, combustion equipment and a turbine arranged in flow series, said turbine having stator vanes and rotor blades, an annular cooling air passage around said stator vanes, a manifold adapted to be supplied with gas under pressure, a plurality of nozzles which are mounted adjacent the rotor blades and whose axes are obliquely arranged with respect to the longitudinal axis of the engine, and a plurality of conduits supplying said nozzles with pressurised gas from said manifold, said nozzles being arranged to direct the pressurised gas onto the rotor blades for effecting starting of the engine, and said conduits extending through said cooling air passage and spaced from the walls thereof to permit flow of cooling air through said cooling air passage.

2. A gas turbine engine as claimed in claim 1 in which the outer ends of the stator vanes are provided with platforms, the said nozzles being formed integrally with said platforms.

3. A gas turbine engine including compressor means, combustion equipment, a high pressure turbine and a low pressure turbine arranged in flow series, said low pressure turbine having stator vanes and rotor blades, an annular cooling air passage around said stator vanes, a manifold adapted to be supplied with gas under pressure, and a plurality of conduits which direct pressurised gas from the said manifold and onto the said rotor blades for effecting starting of the engine and extending through said cooling air passage, said conduits being of a diameter less than any dimension of the air passage and spaced apart to permit flow of cooling air through said cooling air passage.

4. A gas turbine engine including compressor means, combustion equipment and a turbine arranged in flow series, said turbine having stator vanes and rotor blades, an annular cooling air passage around said stator vanes, means for supplying a flow of cooling air to said passage which effects cooling of said stator vanes, an annular manifold adapted to be supplied with gas under pressure, and a plurality of straight conduits whose axes are obliquely inclined relative to the longitudinal axis of the engine, said conduits communicating with said manifold and traversing said passage so as to permit flow of cooling air therethrough, said conduits directing pressurized gas from said manifold onto said rotor vanes for effecting starting of the engine.

5. A gas turbine engine including compressor means, combustion equipment and a turbine arranged in flow series, said turbine having stator vanes and rotor blades, an annular cooling air passage around said stator vanes, means for supplying a flow of cooling air to said passage which effects cooling of said stator vanes, an annular manifold adapted to be supplied with gas under pressure, a plurality of straight conduits secured to said manifold and communicating therewith, the axes of said conduits being obliquely inclined relative to the longitudinal axis of the engine, a plurality of straight nozzles which are mounted adjacent the rotor blades, said conduits traversing said passage so as to permit flow of cooling air therethrough and communicating with said nozzles, the axis of each nozzle being aligned with that of the respective conduit communicating therewith, said nozzles directing pressurized gas from said manifold onto said rotor vanes for effecting starting of the engine.

6. A gas turbine engine including compressor means, combustion equipment and a turbine arranged in flow series, said turbine having stator vanes and rotor blades, first, second and third annular casing members arranged successively radially outwardly of one another, said stator vanes being disposed within and mounted on said first annular casing member, said stator vanes having platforms at their radially outer ends which are radially spaced from said second casing member, said platforms completing with said first casing member an inner wall of an annular cooling air passage whose outer wall is formed by said second casing member, means for supplying a flow of cooling air to said passage which effects cooling of said stator vanes, said third casing member forming with said second casing member an annular manifold adapted to be supplied with gas under pressure, a plurality of straight conduits secured to said second casing member and communicating with said manifold, the axes of said conduits being obliquely inclined relative to the longitudinal axis of the engine, a plurality of straight nozzles formed integrally with said platforms, said conduits traversing said passage and being spaced to permit flow of cooling air therethrough and communicating with said nozzles, the axis of each nozzle being aligned with that of the respective conduit communicating therewith, said nozzles directing pressurized gas from said manifold onto said rotor vanes for effecting starting of the engine.

References Cited in the file of this patent
UNITED STATES PATENTS

| | | |
|---|---|---|
| 2,457,833 | Redding | Jan. 4, 1949 |
| 2,614,384 | Feilden | Oct. 21, 1952 |
| 2,628,067 | Lombard | Feb. 10, 1953 |
| 2,672,013 | Lundquist | Mar. 16, 1954 |
| 2,714,802 | Wosika | Aug. 9, 1955 |
| 2,856,755 | Szydlowski | Oct. 21, 1958 |
| 2,989,848 | Paiement | June 27, 1961 |

FOREIGN PATENTS

| | | |
|---|---|---|
| 1,218,064 | France | Dec. 14, 1959 |